Nov. 2, 1965 U. I. VAN EYCKE 3,214,848
APPARATUS FOR TEACHING CHILDREN NUMBERS, ALPHABET LETTERS
AND THE SPELLING OF NUMBERS
Filed July 3, 1963 2 Sheets-Sheet 1
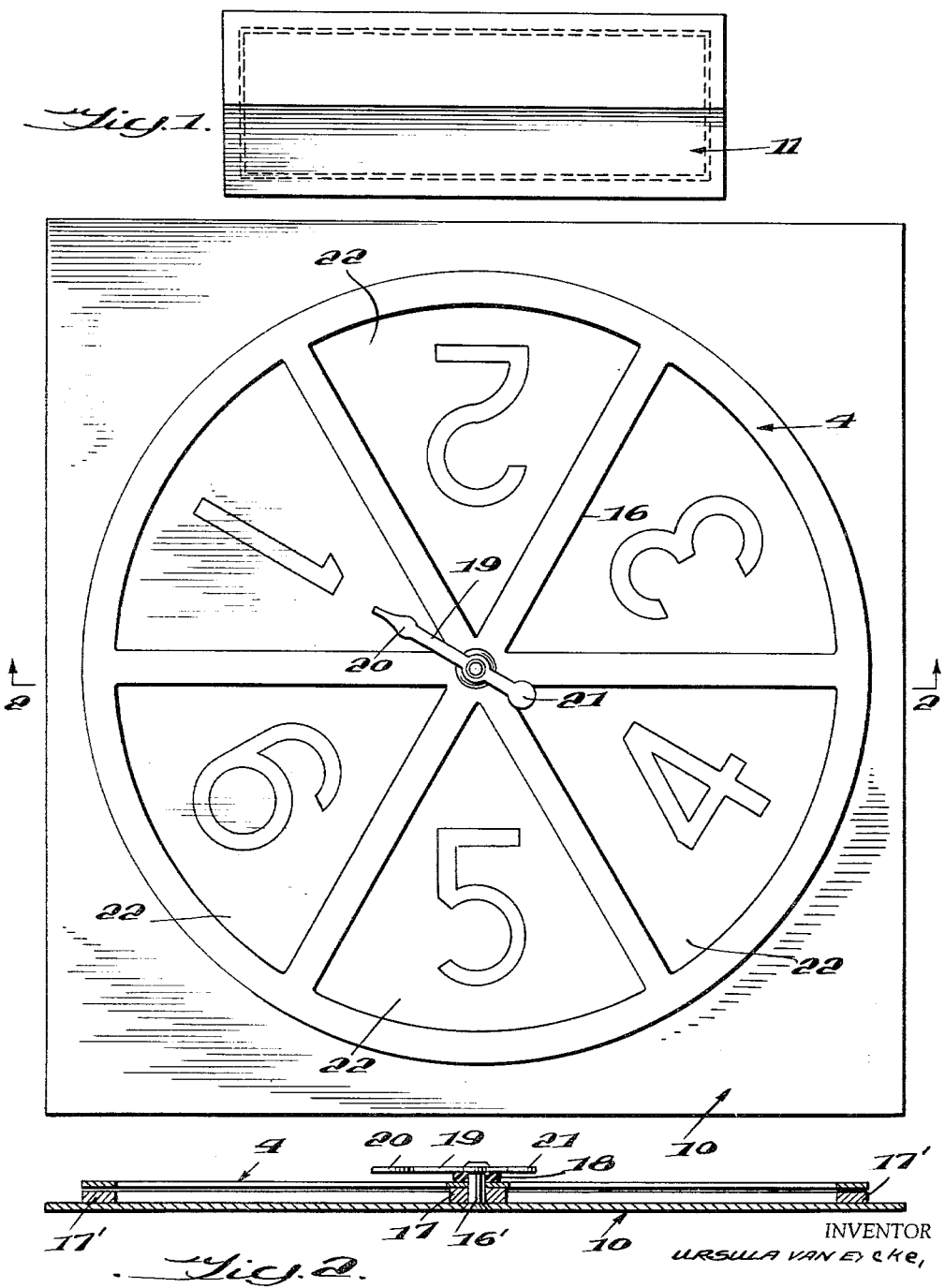
INVENTOR
URSULA VAN EYCKE,
BY William H. Bauer,
ATTORNEY Nov. 2, 1965 U. I. VAN EYCKE 3,214,848
APPARATUS FOR TEACHING CHILDREN NUMBERS, ALPHABET LETTERS
AND THE SPELLING OF NUMBERS
Filed July 3, 1963 2 Sheets-Sheet 2

INVENTOR
URSULA VAN EYCKE,

BY William H. Bauer
ATTORNEY

United States Patent Office 3,214,848
Patented Nov. 2, 1965

3,214,848
APPARATUS FOR TEACHING CHILDREN NUMBERS, ALPHABET LETTERS AND THE SPELLING OF NUMBERS
Ursula I. Van Eycke, 706 N. 7th Ave., Maywood, Ill.
Filed July 3, 1963, Ser. No. 292,619
2 Claims. (Cl. 35—35)

This invention relates to a step-by-step method and apparatus for teaching children numbers, alphabet letters and the spelling of numbers.

More particularly the invention relates to the use of an educational board and cards together with a spinner whereby through a step-by-step method first, second and third grade children can be easily taught numbers, alphabet letters and how to spell numbers.

A further object of the invention is to provide a step-by-step method for teaching children numbers, letters and the spelling of numbers in such a manner that a school house atmosphere is constantly maintained.

It is also an object of this invention to provide an educational board and cards which will easily permit each pupil to repeat any number of times on a competitive basis the successive steps played for class graduation and thus assure that the game board and cards can be used not only for children of different mental capacities but also by children mentally retarded.

Other objects, and objects relating to the simplicity of operation and the cost of production of the educational board and the cards with numbers, alphabet letters and number words necessary for playing the step-by-step graduating school games will hereinafter appear in the detailed description to follow in connection with the accompanying drawings forming a part of this disclosure.

In the drawings:

FIGURE 1 comprises a top plan view of an educational board of this invention, and thereabove, is a like view of a collapsible matching card received box which when erected suggests a school house;

FIGURE 2 is a cross sectional view on line 2—2 of FIGURE 1;

FIGURES 4 to 10 both inclusive illustrate cards, a number of each of which can be provided for constituting a set whereby children may be taught through a step-by-step method to know numbers, alphabet letters and the spelling of numbers.

Figures 4, 5, 6:
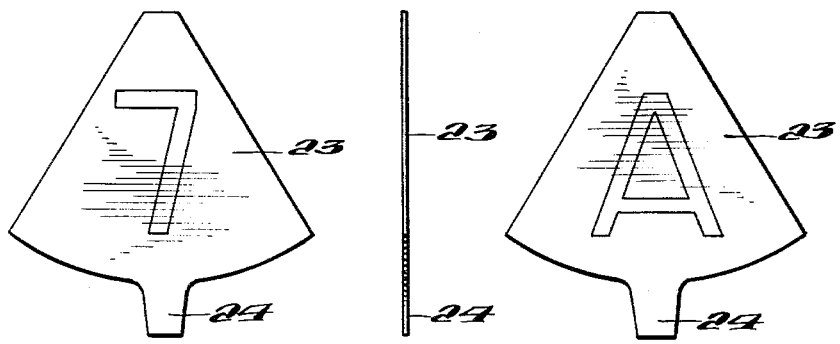
Figures 7, 8, 9:
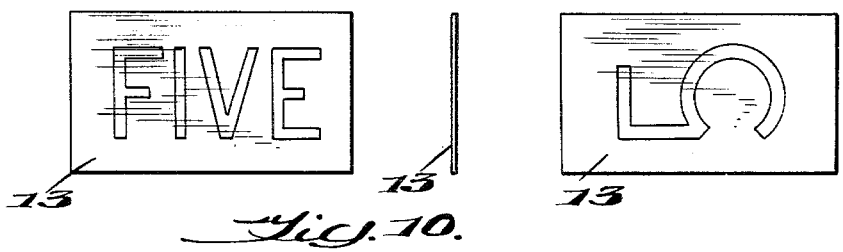
Figure 10:

Briefly, FIGURE 4 above is one face of a number replacement card for the play board, while FIGURE 6 is the other face thereof bearing an alphabet letter, and FIGURE 5 is an edge view of said replacement card;

FIGURE 7 is a face view of a matching card with the alphabet letters for spelling the number 5, while FIGURE 9 is the other face of said matching card with the numeral 5 thereon, and FIGURE 8 is an edge view of the card shown in FIGURES 7 and 9, and FIGURE 10 is a top plan view of a score card.

Figure 3:
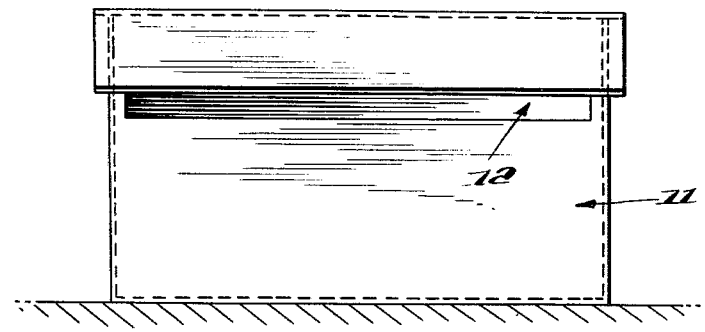
FIGURE 3 is a perspective view of the matching card receiver box shown in plan in FIGURE 1.

Referring to FIGURES 1, 2 and 3 of the drawings more particularly, 10 indicates the educational board which is preferably approximately 16 inches by 12 inches and may be made of wood or other suitable material. A matching card receiver box is indicated generally by the reference numeral 11; it may be made of cardboard and its walls and top so connected that it can be collapsed for shipment or storage.

One wall of the box 11 when open or erected for use provides a slot 12 adapted for receiving matching cards 13 which are illustrated in FIGURES 7 and 9.

On the playing board 10 there is mounted a wheel comprising a rim 4 and spokes 16. The wheel can be made of any semi-rigid material such as cardboard or the like and maintained in spaced relation to the play board 10 by a rivet 16' and a spacer 17. The rim of the wheel should also be supported by spacers 17' at the points where the rim is intercepted by the respective spokes 16 of the wheel as shown in FIGURE 2.

The need of holding the wheel in spaced relation to the top of the play board will later become apparent.

The rivet 16' extends above the hub of the wheel 14; its upper end is fitted with a spacer 18 and above the spacer is rotatably mounted a spinner 19 having a pointer 20 at one end and an enlargement 21 at its other end. The upper end of the rivet 16' is upset or provided with a suitable cap to hold the spinner on the rivet for rotation in either direction.

It will be noted that the numbers 1 to 6 both inclusive which may be stamped or painted on the upper surface of the board 10, will fall within the six segments or areas 22 provided on the board 10 by the spokes 16 of the wheel 14. As heretofore noted FIGURES 4 and 6 show the opposite faces of a replacement card 23. The replacement card 23 is the same in shape as a section 22; it has a handle 24; one face of the card has stamped thereon the number 7 and the other face has the letter A. The replacement card 23 will fit any one of the spaces provided between the play board 10 and the wheel rim 15 and in each case the replacement card will cover any one of the numbers 1, 2, 3, 4, 5 and 6 on the respective areas 22 of the game board. The numbers of the replacement cards are to permit graduation of pupils from one series of numbers to a higher series, i.e. numbers 1 to 6 can be changed to the numbers 7 to 12. The same cards serve for graduating pupils to letters or alphabet letters, namely by placing the replacement card 23 on its appropriate face it provides the first letter of the alphabet. Thus 26 of these replacement cards would serve for step-by-step teaching method of teaching the numbers 1 to 26 both inclusive as well as the entire alphabet. The replacement cards would be put into position by the teacher who can be a parent of one of the children or anyone that knows the manner in which the step-by-step games are played.

A number of the matching cards 13 (FIGURES 7, 8 and 9) are provided for the pupils. One face of the card bears the number 5 and its other face has printed thereon the word FIVE. The pupils place these cards in the box 11 when permitted under the rules of the game being played. For example, if the numbers 1 to 6 were being used each pupil would be given six of these matching cards 13.

As is apparent these cards will serve for teaching the pupils the numbers 1 to 6 as well as teaching them the spelling of said numbers. Sets of cards can be provided for as many succeeding numbers as desired and the spelling of the respective numbers on the opposite faces of said cards is illustrated by FIGURES 7 and 9.

FIGURE 10 shows a score card 26. This is used for giving credits to the winner, i.e. a bold colored star 27 for example. In addition to the different colored stars for rewards, diplomas and "dunce caps" may be provided.

There are three separate steps to play and learn the numbers, the alphabet and how to spell the numbers. To begin, the play board is placed on a flat surface and the box 11 is unfolded and placed adjacent to the board, as shown in FIGURE 1. As shown in FIGURE 1 the play board has painted or printed on its surface the numbers 1 to 6 both inclusive. The next step is that each of the players receive a report card and matching cards are given each player, i.e. cards 1 to 6. The first player who spins the spinner 19 in FIGURES 1 and 2 and the pointer 20 stops in say the area 22 occupied by the numeral 1, must say out loud "one" and then put his matching card for "1" thereon in the box 11. The other players following go through the same procedure as the first. These are the rules of the game. If the pointer of the spinner stops on a spoke 16 said player loses his turn. Also if the pointer lands in the area of a number for which a card has already been put in the school house, the player likewise loses his turn. The first player who gets all six cards in the box 11 is given a gold star on his report card. The next player nearest to getting all his cards into the school house receives a red star, and the last one, that is, who still retains the greater number of cards, gets a red star and this player must also wear the dunce cap for the next part of the game. It should be here noted there are five parts to a game, i.e. each part constituting a period during which each pupil has his trial with the spinner 19. Consequently with the rewards just described the dunce cap must be worn by one of the players five times during the playing of a complete game.

As previously indicated herein, when the numbers 1 to 6 have been learned by the children then they may be changed to 7 to 12 by the use of replacement cards 23. These replacement cards should be inserted by the teacher in their numerical order in the spaces provided therefor between the play board 10 and the wheel 4, i.e. the areas 22. As is apparent, the series of replacement cards for the consecutive number game can continue to 30 or more numbers which ever may be desired.

After the children know the numbers the matter of teaching them the alphabet letters is started. At this time the wedges shown in FIGURES 4 and 6 are used to replace the numbers by a series of letters beginning with A. It should also be here noted that the said wedges can be sufficient for the entire alphabet, and that the series of games would be six in order to teach each child to know the entire vocabulary.

To begin the teaching of the pupils the spelling of numbers, the matching cards shown in FIGURES 7 and 9, i.e. one face with a number and one face with the spelling of said number are used. The first player for instance, on operating the spinner the pointer 20 falls on number 5. The player then seeks from his cards the spelling of FIVE. Then he spells the number five and places his card in the box 11 as was the case with the learning of numbers. The game continues as with the numbers until the children learn the spelling of each of said numbers. This is accomplished in five or six games. All the cards that go into the box 11 must be identified by the player as to number and the player must also say out loud the spelling of the number before he places them in the box 11. The matter of rewards is the same as with the number game.

The apparatus I have described above for small children can also be played without a teacher, that is, by the children who know the game. In this case when numbers are used, say 30, here again there would be a graduation of one or more of the players every part of the game played, i.e. the graduation of the player who on one game gets all of his cards in the box 11. The rewards can be the same as in connection with the alphabet letters or the numbers.

As is apparent, various changes may be made to the form of my invention herein shown and described without departing from the spirit thereof or the scope of the claims.

I claim:

1. A chance game apparatus for teaching children numbers, letters of the alphabet, and the spelling of the numbers taught, comprising a play board, a wheel rim and spokes forming a hub spaced from said play board to provide a peripheral opening around the play board, a series of spacers underlying said rim placed respectively at the other end of each spoke whereby to divide said peripheral opening into sectors, a spinner mounted on the hub formed by the spokes of said rim, sets of sector or wedge shaped cards for the teacher, each with a number on one face and an alphabet letter on its other face, and each of said cards being inserted into said peripheral opening and guided by said spacers for locating the wedge cards over sectors provided by said spacers, sets of matching cards for the children players each with a number on one face and the letters for spelling said number on its opposite face, whereby each pupil being given matching cards with letters or numbers the same as the teacher has made to appear on the sectors provided by the spokes and rim on the said board, each player can in turn operate the spinner, and the first to match all of said numbers or letters seen within the sectors wins the game.

2. A chance game board structure according to claim 1 in which each wedge shaped card has its peripheral edge provided with a tab to serve as a handle for inserting said card in the peripheral openings provided therefor around the play board.

References Cited by the Examiner
UNITED STATES PATENTS

| | | | |
|---|---|---|---|
| 2,681,804 | 6/54 | Stover | 35—73 X |
| 2,693,362 | 11/54 | Ford | 35—73 X |

EUGENE R. CAPOZIO, *Primary Examiner.*

LAWRENCE CHARLES, JEROME SCHNALL,
*Examiners.*